United States Patent [19]

Suggitt et al.

[11] 3,985,639

[45] Oct. 12, 1976

[54] CATALYTIC CRACKING PROCESS

[75] Inventors: Robert M. Suggitt, Wappingers Falls, N.Y.; Peter L. Paull, Weston, Conn.

[73] Assignee: Texaco Inc., New York, N.Y.

[22] Filed: July 19, 1974

[21] Appl. No.: 489,878

[52] U.S. Cl. .............................. 208/120; 208/52 CT; 208/74; 208/164; 208/305; 252/411 R; 252/415
[51] Int. Cl.² ..................... C10G 11/18; B01J 29/38
[58] Field of Search ......... 208/120, 305, 48, 52 CT, 208/251 R; 252/411 R, 415

[56] References Cited
UNITED STATES PATENTS

| | | | |
|---|---|---|---|
| 3,122,497 | 2/1964 | Erickson | 208/120 |
| 3,146,188 | 8/1964 | Gossett | 208/73 |
| 3,150,074 | 9/1964 | Smith et al. | 208/113 |
| 3,150,075 | 9/1964 | Russell et al. | 208/120 |
| 3,151,088 | 9/1964 | Sanford et al. | 252/416 |
| 3,168,459 | 2/1965 | Anderson et al. | 208/57 |
| 3,168,460 | 2/1965 | Lehman et al. | 208/67 |
| 3,168,482 | 2/1965 | Anderson et al. | 252/415 |
| 3,182,025 | 5/1965 | Simantel | 252/415 |
| 3,201,341 | 8/1965 | Anderson et al. | 208/74 |
| 3,418,256 | 12/1968 | Rigney et al. | 252/415 |
| 3,909,392 | 9/1975 | Horecky et al. | 208/120 |

*Primary Examiner*—Delbert E. Gantz
*Assistant Examiner*—G. E. Schmitkons
*Attorney, Agent, or Firm*—Thomas H. Whaley; Carl G. Ries; George J. Darsa

[57] ABSTRACT

This invention relates to a process for catalytically cracking hydrocarbon feedstocks containing a contaminant deleterious to the process and catalyst and to a method for removing the contaminant from a crystalline aluminosilicate cracking catalyst used in the process, where the contaminant is vanadium, or vanadium and nickel, and optionally iron.

28 Claims, No Drawings

CATALYTIC CRACKING PROCESS

This invention relates to a process for catalytically cracking hydrocarbon feedstocks containing metal contaminants and to a method for removing metal contaminants from cracking catalysts. In particular, this invention relates to the catalytic cracking of hydrocarbon feedstocks contaminated with a metal poisonous to the cracking catalyst and to a method for removing the metal contaminant from the catalyst which has been contaminated by use in the cracking process.

BACKGROUND OF THE INVENTION

In the catalytic cracking process, hydrocarbon feedstocks are converted under catalytic cracking conditions wherein at least a portion of the feedstock is converted to desired lighter hydrocarbon products. In general, catalytic cracking of the feedstock is undertaken in a fluidized bed, moving bed or fixed bed of catalyst at elevated temperatures generally ranging from about 850° to 1300°F. In the course of transforming the feedstock to more desirable products such as gasoline, liquefied petroleum gas, alkylation feedstocks and middle distillate blending stocks, a concomitant by-product formation occurs of an undesirable nature wherein coke is deposited on the catalyst. The substantial deposition of coke on a cracking catalyst reduces the catalyst's cracking activity and selectivity leading to a reduction is desired product formation.

The feedstocks employed in the catalytic cracking process consist of hydrocarbons that are liquids or solids at room temperature and which are at the catalytic cracking conditions in a fluid state, that is liquid or vapor. The desired products of the conversion are generally lower boiling materials. The feedstocks employed in the process can be derived from a plurality of sources such as petroleum, coal, shale oil or tar sands, including particular fractions of each of the above. The various sources of feedstock mentioned above and hydrocarbon fractions derived therefrom, particularly the heavier and higher boiling fractions, can contain in addition to the hydrocarbons metal contaminants which adversely affect the catalytic cracking process. A particularly deleterious contaminant found in the heavier fractions is vanadium, generally present as an organometallic compound, which in the course of the cracking reaction is deposited upon the catalyst in a form that substantially alters the selectivity and activity of the conversion process. The vanadium contaminant deposited on the catalyst unlike coke is not removed during regeneration. Continued use of the catalyst, therefore, causes progressively increasing quantities of vanadium to be deposited on the catalyst and such accumulation severely alters the selectivity and activity of the catalytic reactions. Another deleterious contaminant commonly found in the heavier fractions is nickel which is also known for its undesirable effect on the catalyst and cracking process. It will be appreciated that even low levels of metal contaminants in the feed cause the catalyst upon extended use to collect increasing quantities of the undesirable materials.

To overcome the debilitating effect of these metals on the catalyst and process, the art has proposed methods for demetalizing the catalyst employed in the catalytic cracking of contaminated feedstocks. Illustratively U.S. Pat. No. 3,151,088 discloses a method for removing vanadium, and also nickel, by vapor phase methods from conventional solid oxide cracking catalysts composed of, for example, synthetic gel silica-alumina. Essentially, the method for removing the contaminating metal involved sulfiding the catalyst and contacting the catalyst with carbon monoxide to remove nickel contaminant therefrom as volatile nickel carbonyl. Vanadium was also removed by chlorination at an elevated temperature employing a chlorinating reagent including molecular chlorine, chlorine substituted light hydrocarbons, sulfur chlorides, combinations of hydrogen sulfide and molecular chlorine, and hydrogen chloride and molecular chlorine. Prior to the chlorinating treatment, the coked catalyst was regenerated until the carbon content was less than about 5 weight percent and preferably less than about 0.5 weight percent.

The method described above for removing contaminants from the subject cracking catalyst, however, is unsuitable with regard to present day processes employing as cracking catalysts composites containing crystalline aluminosilicates or as they are sometimes referred to, zeolites. Employing the methods of the prior art when attempting to remove contaminants from present day catalysts, will contribute to the destruction of the crystalline aluminosilicate structure of the catalyst and reduce catalyst activity and selectivity. The catalytic cracking process is also affected through a loss of conversion and selectivity to desired products.

It is therefore an object of this invention to provide a process for catalytically cracking hydrocarbon feedstocks containing metal contaminants.

Another object of this invention is to provide a method for removing metal contaminants from crystalline aluminosilicate cracking catalysts which have become contaminated by use in cracking feedstocks containing metal contaminants.

Yet another object of this invention is to provide a process for converting hydrocarbon feedstocks containing metal contaminants in the presence of crystalline aluminosilicate cracking catalysts.

Other objects and advantages will become apparent from a reading of the following detailed description.

SUMMARY OF THE INVENTION

Broadly, this invention contemplates a process for catalytically cracking a hydrocarbon feedstock contaminated with vanadium which comprises:

a. contacting the feedstock with a crystalline aluminosilicate cracking catalyst under catalytic cracking conditions thereby effecting conversion of at least a portion of the feedstock to lighter hydrocarbons and depositing coke and vanadium on the catalyst;

b. regenerating the catalyst by contacting with oxygen to effect combustion of the coke to gaseous products comprising carbon monoxide and under conditions deterring formation of pentavalent vanadium;

c. contacting the regenerated catalyst of (b) with molecular chlorine wherein the vanadium is converted to a volatile chloride of vanadium and separating the chloride from the catalyst; and d. contacting the feedstock with the catalyst of (c) under catalytic cracking conditions as in (a).

In another embodiment of this invention, there is contemplated a method for removing metal contaminant from a crystalline aluminosilicate cracking catalyst which has been contaminated with vanadium by use in converting a hydrocarbon feedstock containing the metal which comprises contacting the catalyst at an elevated temperature with molecular chlorine and separating a chloride or vanadium.

In a further embodiment of this invention, a cracking process is contemplated which comprises (a) contacting a vanadium contaminated feedstock with a crystalline aluminosilicate cracking catalyst under catalytic cracking conditions thereby effecting conversion of at least a portion of the feedstock to lighter hydrocarbons and depositing coke and vanadium on the catalyst; (b) regenerating the catalyst by contacting with oxygen to effect combustion of the coke to gaseous products comprising carbon monoxide and under conditions deterring formation of pentavalent vanadium; (c) treating the regenerated catalyst of (b) with hydrogen, carbon monoxide or a mixture of carbon monoxide and hydrogen; (d) contacting the treated catalyst of (c) with molecular chlorine wherein the vanadium is converted to a volatile chloride of vanadium and separating the volatile chloride from the catalyst; and (e) contacting the feedstock with the catalyst of (d) under catalytic cracking conditions as in (a).

In accordance with the present invention, the hydrocarbon feedstock catalytically cracked may be derived from petroleum, coal, shale oil or tar sands. Such hydrocarbon feedstocks, and particularly the higher boiling fractions, catalytically cracked according to this invention are contaminated with vanadium in an amount ranging from 1 part per million up to about 200 parts per million and particularly from 2 to 50 parts per million. Typically, the contaminated feedstocks are denominated as containing organovanadium complexs such as porphyrins and non-porphyrins, and may include high boiling (above 900°F.) or non-volatile fractions of petroleum, shale oil, tar sands or liquified coal. The hydrocarbon feedstock catalytically cracked by this invention may include whole crude, topped crude, atmospheric residuum, vacuum residuum and gas oils containing residuum. The above sources of the cracking feedstocks or the feedstocks themselves can be partially demetallized, as for example, demetallizing a petroleum residuum containing about 500 ppm of vanadium by means of light paraffin deasphalting to provide a residuum containing less than 200 ppm of vanadium.

The hydrocarbon feedstock mentioned above in addition to containing vanadium may also contain nickel contaminants in amounts of up to about 100 parts per million, preferably amounts not exceeding 30 parts per million. In some instances iron may also be present in the feedstock up to about 2000 parts per million and picked up as tramp iron from transportation, storage and/or processing equipment. The cracking feedstock should also contain less than 10 parts per million of sodium and may contain sulfur.

The catalysts employed in the instant cracking process and from which metal contaminants are subsequently removed are known to the art. In general, the cracking catalysts are composites comprising a crystalline aluminosilicate, including both the naturally occurring and synthetic varieties, which posses ordered rigid 3-dimensional structures having uniform pore diameters often referred to in the art as zeolites. The crystalline aluminosilicate portion of the composite catalyst is a natural or synthetic alkali metal crystalline aluminosilicate which has been treated to replace all or at least a substantial portion of the original alkali metal ions with other cations such as for example, ammonium cations and/or a metal or combination of metal cations, such as for example calcium, magnesium or rare earth metals (e.g. cerium, lanthanum, neodymium, praseodymium, samarium and yttrium). The crystalline aluminosilicates are generally composited with or formed from another material which may possess cracking activity and usually referred to as the matrix, as for example, a catalytically active siliceous matrix which may be of the synthetic, semi-synthetic or natural clay-type aluminosilicate. Alternatively, silica gel, silica-beryllia, silica-magnesia, silica-alumina, silica-thoria, silica-titania and silica-zirconia may be employed as the siliceous matrix. Typically, materials such as silica-alumina, silica-magnesia or clay-type aluminosilicates form a substantial portion of the catalyst composite. In general, the catalyst composite contains from about 1 to 25 weight percent crystalline aluminosilicate with the remainder composed of matrix material, all of which is well known to the art.

Catalytically cracking hydrocarbon feedstocks containing, for example, vanadium contaminants under catalytic cracking conditions in the presence of a crystalline aluminosilicate cracking catalyst described above causes a build-up on the catalyst of the contaminating metal. The contaminating metal, or metals, as it builds up on the catalyst attacks the crystalline structure of the zeolite and causes the catalyst to lose activity. Further, the matrix material usually contributes to the cracking activity of the catalyst and attack of the matrix can also lower cracking activity. Illustratively, the matrix, when composed of for example silica-alumina or semi-synthetic or natural clay-type material having a kaolinite-type structure, is gradually converted in the presence of vanadium in the pentavalent state to mullite. Mullite is highly undesirable inasmuch as it has virtually no surface area or pore volume and mullite itself possesses no cracking activity. The loss of surface area or pore volume causes the matrix to lose another important characteristic, namely its ability to accept and remove coke otherwise interfering with the catalyst's active cracking sites and particularly with the zeolite component. The loss of pore volume by conversion of the matrix to mullite is deleterious when fluid catalytic cracking is undertaken in that the catalyst composite is not as easily fluidized. While fluidization characteristics of the catalyst are not necessary in moving bed or fixed bed cracking, the presence of vanadium nevertheless attacks the zeolite or matrix components destroying a portion of the crystalline or porous structure, reducing the activity of the catalyst and altering the selectivity of the process from desired products. Vanadium, aside from hastening destruction of the components of the catalyst, also promotes unwanted reactions during the cracking operation, such as dehydrogenation where the production of hydrogen and coke are increased at the expense of reduced yields of desired liquid product.

Consequently, accumulation of metal contaminants on the catalyst and particularly the vanadium contaminant should not be permitted to exceed 15,000 parts per million per weight of catalyst, and preferably not above 5,000 parts per million, as the degrading effects of the metal contaminant become severe above such levels of contamination. In general, a catalyst contaminated with from about 2,000 to 15,000 parts per million of vanadium per weight of catalyst is treated in accordance with the present invention to provide a rejuvenated catalytic composite having a reduction in vanadium content of from 5 to 50 percent, preferably 10 to 40 percent. When nickel contaminants are also present in the feedstock, the catalyst should not be permitted to accumulate more than 3,000 parts per million of nickel, preferably not over 1,000 ppm, before treatment of the catalyst in accordance with this invention is undertaken. The treatment herein returns the catalyst to a condition having a reduction in nickel content of from 5 to 50 percent, preferably 10 to 40 percent. It will be appreciated that our process preferentially removes the surface contaminant, that is, the contaminant most recently introduced through the course of the cracking reaction.

In accordance with one embodiment of the present invention, a hydrocarbon feedstock described above containing vanadium and which may additionally contain nickel or iron contaminants is contacted with a crystalline aluminosilicate cracking catalyst under catalystic cracking conditions including temperatures ranging from about 850° to 1300°F. where the feedstock undergoes a conversion including recycle within the range of about 20 to 100 percent to desired lower boiling products. In fluid catalytic cracking operations, the weight ratio of catalyst to hydrocarbon can range from about 2 to 20 employing riser space velocities of 2 to 5 volumes of hydrocarbon feed per hour per volume of catalyst. Operating in accordance with the conditions described above, the catalytic cracking of the hydrocarbon feedstock causes deposition of coke on the catalyst in amounts ranging from about 3 to 15 weight percent per pass along with the gradual deposition on the catalyst of vanadium accumulating after successive periods of use in amounts of from 2,000 up to 15,000 parts per million per weight of catalyst, and additionally nickel or iron if present in the feedstock, depending upon the metal content of the feed, catalyst inventory and rate of catalyst replacement. Illustratively, when an Arabian light atmospheric residuum having an API Gravity of 23 containing 26 ppm of vanadium and 6 ppm of nickel is introduced to a fluid catalytic cracking unit to crack 20,000 barrels per day of feed with a catalyst inventory of 150 tons, the equilibrium catalyst will accumulate 0.055 weight percent vanadium and 0.012 weight percent nickel per day assuming no catalyst withdrawals or make-up. If the total contaminating metal content of the catalyst is to be maintained at, for example, a 0.3 weight percent level, then it is necessary to withdraw and replace in excess of 18 percent of the catalyst inventory daily, a practice which is clearly impractical from an economic point of view.

To successfully control the otherwise deleterious effects of the metal contaminants on the crystalline aluminosilicate cracking catalyst, it is necessary that the catalyst be initially regenerated by contacting with an amount of oxygen or an oxygen containing gas sufficient to effect combustion of at least about 85 percent and up to about 99 percent of the coke to gaseous products, where the gaseous carbon products comprise carbon monoxide and under conditions which deter formation of pentavalent vanadium. This may be accomplished by initially ceasing contact of catalyst and feedstock or withdrawing catalyst from the cracking zone where the catalyst can be contacted with a stripping medium such as steam at a temperature ranging from about 600° to 1100°F. such that the catalyst in place or withdrawn from the reaction zone is stripped of entrained and absorbed hydrocarbons. The stripped catalyst is thereafter regenerated or introduced to a regeneration zone and contacted with oxygen or an oxygen containing gas at regeneration temperatures of from about 900° to 1350°F., preferably 1000° to 1250°F., where the quantity of oxygen is sufficient to reduce the coke content of the catalyst to a level of less than 0.5 weight percent and preferably below 0.3 weight percent. During regeneration, coke is converted to gaseous products including carbon monoxide, carbon dioxide and water vapor. The quantity of oxygen introduced however should not be sufficient to convert all of the carbon monoxide formed during regeneration to be further converted to carbon dioxide. The amount of carbon monoxide relative to carbon dioxide produced in the regenerator should be at least in the ratio of 1:4 and preferably at least about 1:1 thereby providing the regenerator with a reducing atmosphere, a condition which deters formation of pentavalent vanadium and permits the vanadium to be retained in a lower valence state. An atmosphere of carbon oxides composed of predominantly carbon monoxide is particularly preferred. If instead the vanadium is permitted to be oxidized to the pentavalent state, accelerated destruction of the cracking catalyst will result particularly when regeneration temperatures in excess of 1370°F. are employed.

It is essential that the catalyst regenerated to coke levels of below 0.5 weight percent and preferably below 0.3 weight percent be provided essentially completely free of volatile materials including moisture and hydrocarbons prior to the removal of vanadium. The presence of the volatile materials in substantial quantities will contribute to the destruction of the crystallization alluminosilicate structure under the conditions described below for removing the vanadium contaminant.

In a preferred embodiment, the regenerated catalyst following separation of the regenerating gases is contacted with a reducing atmosphere of hydrogen, carbon monoxide or a mixture of carbon monoxide and hydrogen, such as synthesis gas, at a temperature of from about 900° to 1300°F., preferably 1100° to 1250°F., to reduce to a lower valence state the contaminating metals present on the surface of the catalyst. The reducing atmosphere employed should be essentially free of sulfur compounds, such as hydrogen sulfide, as metal sulfides would otherwise be formed. The presence of metal sulfides on the catalyst are to be avoided, particularly during the subsequent chloriding step, inasmuch as sulfur chlorides would be generated which in turn attack and destroy the zeolite structure forming sulfur oxides and volatile halides such as aluminum chloride.

In another embodiment and in those instances where the catalyst is additionally contaminated with nickel in the course of catalytically cracking the feedstock, the regenerated catalyst, preferably first having been contacted with the reducing atmosphere at from about 900° to 1300°F., is cooled to a temperature of approximately 100° to 400°F. and contacted with carbon monoxide to form nickel carbonyl. The contacting of the catalyst with carbon monoxide can be undertaken employing pure carbon monoxide or a carbon monoxide containing gas such as carbon monoxide mixed with hydrogen as in synthesis gas. Generally, the carbon monoxide gas is permitted to contact the catalyst for a sufficient period of time to reduce the nickel content on the catalyst from 5 to 50 percent, preferably 10 to 40 percent. The contacting with carbon monoxide, suitably as a stream flowing over and through the catalyst, can be undertaken for periods of from 1 to 24 hours and at pressures ranging from atmospheric to about 1500 p.s.i.g. By contacting the nickel contaminated catalyst with carbon monoxide the metal is converted to the volatile carbonyl which can be swept from the presence of the catalyst by a stream of carbon monoxide or an inert gas such as nitrogen.

The catalyst described above regenerated to a coke level of below 0.5 weight percent, preferably below 0.3 weight percent, and essentially completely free of volatile materials such as moisture or hydrocarbons is contacted with molecular chlorine wherein the vanadium contaminant deposited on the catalyst is converted to a volatile chloride of vanadium, such as vanadium chloride or vanadium oxychloride, and the volatile chloride is separated from the catalyst. In general, treatment of the catalyst with molecular chlorine is undertaken at temperatures of from about 500° to 900°F., preferably 700° to 850°F., with sufficient chlorine so as to reduce the vanadium content of the catalyst from 5 to 50 percent, preferably 10 to 40 percent. In particular, the catalyst is contacted with an environment of molecular chlorine alone or in the presence of nitrogen, carbon dioxide or oxygen and a pretreatment of the catalyst with, for example, a sweep of nitrogen, carbon dioxide or oxygen prior to contacting with chlorine is desirable. To successfully remove vanadium from the catalyst while simultaneously deterring destruction of the crystalline aluminosilicate structure of the composite, the contacting is undertaken under conditions that are essentially anhydrous and substantially free of hydrogen and volatile carbon compounds, such as hydrocarbons and carbon monoxide, that is, an environment containing less than 20 parts per million of the aforementioned components. Chlorinated hydrocarbons, such as carbon tetrachloride, should not be present as they cause destruction of the zeolite by forming aluminum chloride. Hydrogen halides or materials which can combine to form hydrogen halides should be excluded during the contacting with chlorine. Apart from sulfates and sulfur dioxide, sulfur or sulfur compounds such as hydrogen sulfide or metal sulfides, e.g. ferrous sulfide, are also deleterious to the crystalline structure and activity of the catalyst and their presence along with chlorine will promote the destruction of the zeolite.

The contacting of the catalyst with molecular chlorine at temperatures of from 500° to 900°F., and at chlorine partial pressures of from 10 mm. to about 100 p.s.i.a., preferably from about 5 to 50 p.s.i.a., removes the vanadium contaminant in the form of a volatile chloride that can be swept from the presence of the catalyst by purging with air or nitrogen, at temperatures suitable for volatilization of the vanadium chlorides. When iron is present on the catalyst as a contaminant, volatized iron chlorides are also swept from the presence of the catalyst. Generally, at least a molar amount of chlorine necessary to reduce the vanadium content of the catalyst from 5 to 50 percent is employed although a large molar excess of chlorine, as for example, at least a one hundred fold molar excess over the amount of vanadium present is preferably employed. The chlorine can be continuously passed over the catalyst or batch treatments of the contaminated catalyst with chlorine can be undertaken.

Subsequent to the treatment of the catalyst with molecular chlorine and the separation of volatile vanadium chlorides from the catalyst, we prefer to sweep the catalyst by contacting with a flowing stream of hydrogen and at contacting temperatures of 500° to 900°F. The hydrogen sweep should be preceded by an inert gas sweep, such as nitrogen, to remove traces of molecular chlorine and the flow of hydrogen permits removal of residual chloride from contact with the catalyst and particularly, the catalyst surface. The stream of hydrogen can contain hydrogen sulfide, ammonia or a mixture of hydrogen sulfide and ammonia which serve respectively to convert residual metal chlorides to the sulfides and neutralize any generated hydrogen chloride.

In the practice of our invention, it will be appreciated that all or a portion of the contaminated catalyst can be rejuvenated according to the procedures described above. Ordinarily, when a contaminated feedstock is fluid catalytically cracked, only a portion of equilibrium catalyst is withdrawn daily from the regenerator and treated to demetallize the destructive deposits. Complete demetallization of the contaminants from the withdrawn catalyst is not necessary to achieve the improvements of this invention. The extend to which the metals are removed, the rate of frequency of treatment and the portion of catalyst inventory treated will of course depend upon the metals concentration in the feed, the amount of catalyst used per barrel of feed and the rate of fresh catalyst addition. In any event, by treating and returning demetallized catalyst according to our invention, the requirements for fresh catalyst introduction is greatly reduced.

In order to more fully illustrate the nature of this invention and the method of practicing the same, the following example is presented.

EXAMPLE

A West Texas-New Mexico atmospheric residuum having an initial boiling point of 600+°F. and a 50 percent point of 1000°F. with an 18.3° API gravity containing 16 ppm vanadium, 6 ppm nickel and 15 ppm iron, a Conradson carbon residue of 6.30 weight percent and 2.43 weight percent pentane insolubles, 2.41 weight percent sulfur and 1750 ppm nitrogen is fluid catalytically cracked with an equilibrium zeolite cracking catalyst to which fresh zeolite cracking catalyst containing 20 weight percent ammonium and rare earth exchanged crystalline aluminosilicate dispersed in a kaolinite matrix is added. Riser cracking conditions of 10.1 pounds of catalyst per pound of fresh feed at 995°F. and a reactor pressure of 14 p.s.i.g. will provide a product containing on a weight percent basis the following: hydrogen sulfide — 0.69, hydrogen — 0.19, $C_1$ to $C_2$ — 2.61, $C_3$ — 3.66, $C_4$ — 6.43, $C_5$ — 3.49, light naphtha (110°–275°F.) — 11.84, heavy naphtha (275°–400°F.) — 16.14, light gas oil (400°–650°F.) — 29.00, heavy gas oil (650°–950°F.) — 17.65; with 8.30 percent coke on the spent catalyst. Catalytic cracking on a feed once through basis (no recycle) will remove 78 percent of the total nitrogen and 47 percent sulfur from the liquid products. All of the liquid products will be metal free, with the metals being retained on the catalyst. The spent catalyst is regenerated at a regenerator bed temperature of about 1300°F. and the equilibrium catalyst will contain 0.21 weight percent carbon.

To maintain the above activity and selectivity, equilibrium catalyst containing a total of 0.65 percent metal contaminants is withdrawn at a rate of 1.5 pounds of catalyst per daily barrel of feed and a like quantity of fresh catalyst is added. While operational, the high catalyst withdrawal rate places a heavy economic burden on the process.

In a specific embodiment of our process, the total catalyst inventory of the cracking unit and demetallization unit is 9 tons per 1,000 barrels of fresh feed cracked daily, where 6 tons of catalyst per 1,000 daily barrels is used in the catalytic cracking section. The equilibrium catalyst is regenerated at a catalyst bed temperature of 1240°F. with carbonaceous deposits burned with air to primarily carbon monoxide. The regenerated equilibrium catalyst contains 3100 ppm vanadium, 1600 ppm nickel, 2000 ppm iron and 0.23 percent carbon.

One-third of the total catalyst inventory is drawn off daily from the regenerator for demetallization treatment or 3 tons of equilibrium catalyst per 1000 barrels per day of cracking feedstock. This stream of catalyst is passed to an ebulliating bed reactor operating at 1100°F. and a 50 p.s.i.g. hydrogen atmosphere where the average residence time of the fluidized catalyst is one hour. The reduced catalyst is drawn off, depressurized and stripped with dry carbon monoxide while cooling to 200°F.

The reduced catalyst is then pressurized and treated in a flow of carbon monoxide at the rate of 10 cubic feet per hour of carbon monoxide per pound of catalyst for 2 hours at 700 p.s.i.g. and 170°F. to strip off nickel carbonyl. The treated catalyst, after depressurizing and stripping with dry nitrogen contains 1270 ppm nickel.

The nitrogen stripped catalyst is then contacted with a flow of dry chlorine, free of hydrogen chloride, carbon monoxide, hydrogen sulfide or sulfur chloride, at a rate of 5 cubic feet per hour per pound of catalyst at atmospheric pressure for a period of four hours. The treated catalyst is subsequently stripped of chlorine with dry nitrogen and then stripped of chloride by treating at 725°F. with a stream of hydrogen containing one percent hydrogen sulfide and ammonia respectively. The treated catalyst after chlorination is returned to inventory and contains 2200 ppm vanadium and 1180 ppm iron.

When equilibrium catalyst is thus heated, the discarding of large catalyst withdrawals to control metal build-up, destruction of catalyst and loss of selectivity is unnecessary in order to maintain high cracking catalyst activity and selectivity. Instead of the high make-up rates of fresh catalyst of 1.5 pounds per barrel of feed charged such as is needed when equilibrium catalyst demetallization is not practiced, it is seen that fresh catalyst make-up rate may be reduced to a few tenths of a pound per barrel of metal containing residuum feed.

We claim:

1. A process for catalytically cracking a hydrocarbon feedstock contaminated with vanadium which comprises:
  a. contacting said feedstock with a crystalline aluminosilicate cracking catalyst under catalytic cracking conditions thereby effecting conversion of at least a portion of said feedstock to lighter hydrocarbons and depositing coke and vanadium on said catalyst;
  b. regenerating said catalyst by contacting at a temperature of from about 900° to 1350°F. with an amount of oxygen sufficient to effect combustion of at least 85 percent of said coke to gaseous products comprising carbon monoxide and carbon dioxide in a ratio of carbon monoxide to carbon dioxide of at least 1:4 thereby providing a reducing atmosphere during regeneration and detering formation of pentavalent vanadium on said catalyst;
  c. contacting said regenerated catalyst of (b) with molecular chlorine wherein said vanadium is converted to a volatile chloride of vanadium and separating said chloride from said catalyst; and
  d. contacting said feedstock with said catalyst of (c) under catalytic cracking conditions as in (a).

2. A process according to claim 1 wherein said feedstock contains from 1 to 200 parts per million of vanadium.

3. A process according to claim 1 wherein said catalyst is regenerated in (b) to a coke level of less than 0.5 weight percent.

4. A process according to claim 1 wherein said catalyst is regenerated in (b) to a coke level of less than 0.3 weight percent.

5. A process according to claim 1 wherein from 5 to 50 percent of said vanadium is converted to said volatile chloride in (c).

6. A process according to claim 1 wherein from 10 to 40 percent of said vanadium is converted to said volatile chloride in (c).

7. A process according to claim 1 wherein said contacting in (c) is at from about 500° to 900°F.

8. A process according to claim 1 wherein said contacting in (c) is at from 700° to 850°F.

9. A process according to claim 1 wherein said regenerated catalyst contacted in (c) initially contains from 2000 to 15000 ppm of vanadium.

10. A process according to claim 1 wherein said regenerated catalyst of (b) prior to contacting in (c) is treated with hydrogen, carbon monoxide or a mixture of hydrogen and carbon monoxide at about 900° to 1300°F.

11. A process according to claim 1 wherein a portion of said regenerated catalyst of (b) is contacted with molecular chlorine in (c).

12. A process according to claim 1 wherein said feedstock is additionally contaminated with iron and where a volatile chloride of iron is separated in (c).

13. A process according to claim 1 wherein said catalyst of (c) prior to contacting in (d) is treated with hydrogen at 500° to 900°F.

14. A process according to claim 13 wherein said catalyst is treated with hydrogen along with hydrogen sulfide or ammonia or hydrogen sulfide and ammonia.

15. A process for catalytically cracking a hydrocarbon feedstock contaminated with vanadium and nickel which comprises:
  a. contacting said feedstock with a crystalline aluminosilicate cracking catalyst under catalytic cracking conditions thereby effecting conversion of at least a portion of said feedstock to lighter hydrocarbons and depositing coke, vanadium and nickel on said catalyst;
  b. regenerating said catalyst by contacting at a temperature of from about 900° to 1350°F. with an amount of oxygen sufficient to effect combustion of at least 85 percent of said coke to gaseous products comprising carbon monoxide and carbon dioxide in a ratio of carbon monoxide to carbon dioxide of at least 1:4 thereby providing a reducing atmosphere during regeneration and deterring formation of pentavalent vanadium on said catalyst;

c. contacting said regenerated catalyst of (b) with carbon monoxide wherein said nickel is converted to nickel carbonyl and separating said carbonyl from said catalyst;

d. contacting said catalyst of (c) with molecular chlorine wherein said vanadium is converted to a volatile chloride of vanadium and separating said chloride from said catalyst; and e. contacting said feedstock with said catalyst of (d) under catalytic cracking conditions as in (a).

16. A process according to claim 15 wherein said feedstock contains from 1 to 200 parts per million of vanadium and 1 to 100 parts per million of nickel.

17. A process according to claim 15 wherein said catalyst is regenerated in (b) to a coke level of less than 0.5 weight percent.

18. A process according to claim 15 wherein from 5 to 50 percent of said nickel is converted to said carbonyl in (c) and from 5 to 50 percent of said vanadium is converted to said volatile chloride in (d).

19. A process according to claim 15 wherein from 10 to 40 percent of said nickel is converted to said carbonyl in (c) and from 10 to 40 percent of said vanadium is converted to said volatile chloride in (d).

20. A process according to claim 15 wherein said contacting in (c) is at about 100° to 400°F. and said contacting in (d) is at about 500° to 900°F.

21. A process according to claim 15 wherein said regenerated catalyst contacted in (c) initially contains up to 3000 ppm of nickel and from 2000 to 15000 ppm of vanadium.

22. A process according to claim 21 wherein said catalyst contains up to 1000 ppm of nickel.

23. A process according to claim 15 wherein said regenerated catalyst of (b) prior to contacting in (c) is treated with hydrogen, carbon monoxide or a mixture of hydrogen and carbon monoxide at about 900° to 1300°F.

24. A process according to claim 15 wherein a portion of said regenerated catalyst of (b) is contacted with carbon monoxide in (c) and molecular chlorine in (d).

25. A process according to claim 15 wherein said feedstock is additionally contaminated with iron and where a volatile chloride of iron is separated in (d).

26. A process according to claim 15 wherein said contacting in (d) is at from 700° to 850°F.

27. A process according to claim 15 wherein said catalyst of (d) prior to contacting in (e) is treated with hydrogen at 500° to 900°F.

28. A process according to claim 27 where said catalyst is treated with hydrogen along with hydrogen sulfide or ammonia or hydrogen sulfide and ammonia.

* * * * *